US008184780B2

(12) United States Patent
Siminoff

(10) Patent No.: US 8,184,780 B2
(45) Date of Patent: May 22, 2012

(54) SYSTEM AND METHOD FOR CONTROLLING VOICEMAIL TRANSCRIPTION FROM A COMMUNICATION DEVICE

(76) Inventor: James Siminoff, Miami Beach, FL (US)

( * ) Notice: Subject to any disclaimer, the term of this patent is extended or adjusted under 35 U.S.C. 154(b) by 1090 days.

(21) Appl. No.: 12/055,898

(22) Filed: Mar. 26, 2008

(65) Prior Publication Data
US 2008/0240380 A1 Oct. 2, 2008

Related U.S. Application Data

(60) Provisional application No. 60/908,866, filed on Mar. 29, 2007.

(51) Int. Cl.
*H04M 11/00* (2006.01)
(52) U.S. Cl. ..................... 379/88.14; 379/88.22
(58) Field of Classification Search .... 379/88.14–88.27, 379/289; 455/414.4
See application file for complete search history.

(56) References Cited

U.S. PATENT DOCUMENTS

| | | | |
|---|---|---|---|
| 5,537,457 A | 7/1996 | Lantto et al. | |
| 5,768,509 A | 6/1998 | Gunluk | |
| 6,308,329 B1 | 10/2001 | Takahashi | |
| 6,490,561 B1 | 12/2002 | Wilson et al. | |
| 6,633,764 B1 | 10/2003 | Garcia | |
| 6,701,162 B1* | 3/2004 | Everett | 455/556.1 |
| 6,937,983 B2 | 8/2005 | Romero | |
| 7,016,844 B2* | 3/2006 | Othmer et al. | 704/270.1 |
| 7,046,995 B2 | 5/2006 | Rygaard | |
| 7,143,441 B2 | 11/2006 | Rygaard | |
| 7,164,753 B2 | 1/2007 | Engelke et al. | |
| 7,167,861 B2 | 1/2007 | Majumder et al. | |
| 2003/0220784 A1* | 11/2003 | Fellenstein et al. | 704/201 |
| 2005/0089149 A1* | 4/2005 | Elias | 379/88.13 |
| 2006/0223502 A1 | 10/2006 | Doulton | |
| 2006/0234680 A1 | 10/2006 | Doulton | |
| 2007/0054678 A1 | 3/2007 | Doulton | |
| 2007/0116204 A1 | 5/2007 | Doulton | |
| 2007/0117543 A1 | 5/2007 | Doulton | |
| 2007/0117544 A1 | 5/2007 | Doulton | |
| 2007/0117545 A1 | 5/2007 | Doulton | |
| 2007/0117547 A1 | 5/2007 | Doulton | |
| 2007/0260456 A1* | 11/2007 | Proux et al. | 704/235 |
| 2008/0057925 A1* | 3/2008 | Ansari | 455/414.4 |

FOREIGN PATENT DOCUMENTS

EP 1528539 A1 5/2005

OTHER PUBLICATIONS

Burdick, Justin, "Building a Regionally Inclusive Dictionary for Speech Recognition," Computer Science & Linguistics, Spring 2004, pp. 1-5.

(Continued)

*Primary Examiner* — Simon Sing
*Assistant Examiner* — Assad Mohammed
(74) *Attorney, Agent, or Firm* — Lathrop & Gage LLP

(57) ABSTRACT

Systems, methods and software product control voicemail transcription from a communication device. An audio mode is monitored within the communication device to determine a change in status between a sound-on mode and a sound-off mode. Automatic transcription of voicemail messages is enabled if the audio mode status transitions from sound-on to sound-off and automatic transcription of voicemail messages is disabled if the audio mode status transitions from sound-off to sound-on.

31 Claims, 6 Drawing Sheets

OTHER PUBLICATIONS

Burke, Moira, et al. "Error Correction of Voicemail Transcripts in SCANMail," Apr. 22-27, 2006, 10 pages.

Basson, Sara, et al. "New Accessibility Impacts," http://www.liberatedlearning.com/resources/pdf/RC_2003_IBM_SR_Paper.pdf, 2003, 8 pages.

Whittake, Steve, et al. "SCANMail: A Voicemail Interface That Mkes Speech Browsable, Readable and Searchable," Apr. 20-25, 2002, 8 pages.

Openwave Brochure, "The Value of WAP Push," Dec. 2001, 18 pages.

Openwave Brochure, Comparison of WAP Push and Short Message Service (SMS), Apr. 2002, 10 pages.

Stolcke, et al. "Recent Innovations in Speech-to-Text Transcription at SRI-ICSI-UW" IEEE Transactions on Audio, Speech, and Language Processing, vol. 14, No. 5, Sep. 2006, pp. 1-16.

* cited by examiner

US 8,184,780 B2

SYSTEM AND METHOD FOR CONTROLLING VOICEMAIL TRANSCRIPTION FROM A COMMUNICATION DEVICE

RELATED APPLICATIONS

This application claims priority to U.S. Provisional Patent Application Ser. No. 60/908,866, filed 29 Mar. 2007 and incorporated herein by reference.

BACKGROUND

A cell phone user may subscribe to a voicemail translation service that automatically transcribes voicemail messages into text and sends the text to the user as a text message or email. While a valuable service, it is not always desirable to convert all unanswered calls into text, particularly where the cost of the transcription service is based upon the number and length of the transcribed calls. However, to control the transcription service, the user must take manual steps to switch the transcription service on or off.

A cell phone typically includes a button or menu option that allows the user to easily configure the phone to a silent mode. Silent mode may for example be selected when the user does not want to be disturbed or, based on his situation, cannot be disturbed by incoming calls. When receiving a call while operating in silent mode, the cell phone does not audibly signal the operator that there is an incoming call; thus the call often goes unanswered and, instead, is answered by the service provider using a voicemail service. The user of the phone, upon noticing that there is a voicemail waiting, may then contact the service provider to request that the voicemail be played. In one example, the user requests that the voicemail be transcribed into text and returned as a text message or an email by sending the voicemail to a voicemail transcription service. Where a user has many voicemails waiting, the process of sending each one for transcription into a text message is time consuming and cumbersome.

SUMMARY

In an embodiment, a method controls voicemail transcription from a communication device. An audio mode is monitored within the communication device to determine a change in status between a sound-on mode and a sound-off mode. Automatic transcription of voicemail messages is enabled if the audio mode status transitions from sound-on to sound-off and disabling automatic transcription of voicemail messages is disabled if the audio mode status transitions from sound-off to sound-on.

In another embodiment, a method controls a voicemail transcription service from a communication device. An audio mode is monitored within the communication device to determine a change in status between a sound-on mode and a sound-off mode. A transcribe-on command is sent to the voicemail transcription service if the audio mode status transitions from sound-on to sound-off and a transcribe-off command is sent to the voicemail transcription service if the audio mode status transitions from sound-off to sound-on. Automatic transcription of voicemail messages received by the voicemail transcription service is enabled upon receiving the transcribe-on command and automatic transcription of voicemail messages received by the voicemail transcription service is disabled upon receiving the transcribe-off command.

In another embodiment, a system controls voicemail transcription from a communication device. A communication device of the system has an audio mode selectable between sound-on and sound-off, and includes a mode detector for detecting a transition in the audio mode between sound-on and sound-off. The mode detector activates and deactivates automatic transcription of voicemail messages into text.

In another embodiment, a system controls a voicemail transcription service from a communication device. A communication device of the system has an audio mode variable between a sound-on status and a sound-off status. A communication provider of the system is in communication with the communication device and the voicemail transcription service. A mode detector, within the communication device, detects a transition in the audio mode between sound-on status and sound-off status and sends a status message indicating the audio mode status to the communication provider. A status relay within the communication provider sends the status message to the voicemail transcription service, where a voicemail transcription controller, within the voicemail transcription service, activates and deactivates automatic transcription of voicemail messages into text.

In another embodiment, a software product has instructions, stored on computer-readable media, wherein the instructions, when executed by a computer, perform steps for controlling a voicemail transcription service from a communication device, including: instructions for monitoring, within the communication device, an audio mode to determine a change in status between a sound-on mode and a sound-off mode; instructions for enabling automatic transcription of voicemail messages if the audio mode status transitions from sound-on to sound-off; and instructions for disabling automatic transcription of voicemail messages if the audio mode status transitions from sound-off to sound-on.

DETAILED DESCRIPTION OF THE FIGURES

A user may only require transcription of received voicemail messages by a voicemail transcription service when unable to receive calls, such as when in a meeting and unable to answer calls. Other times, such as when the user is busy on another call, transcription of a left voicemail may not be desired in view of the cost of the voicemail transcription service. Control of the voicemail transcription service may be made by visiting a web site of the voicemail transcription service provider to set desired operating characteristics, such as whether or not the transcription service is transcribing and how forwarding of recorded and transcribed messages occurs. Control of the voicemail transcription service may also be effected through use of the call forward feature that is used to implement the voicemail transcription service. However, this may result in voicemail messages being stored in two separate voicemail boxes: a first voicemail box provided by the cell phone service provider that is used when call forwarding is not engaged and a second voicemail box provided by the voicemail transcription service that is used when call forwarding is engaged. If either mode of transcription service control is used, there is considerable inconvenience to the user. The below described system, method and software product provide for controlling the transcriptions service.

Figure 1:
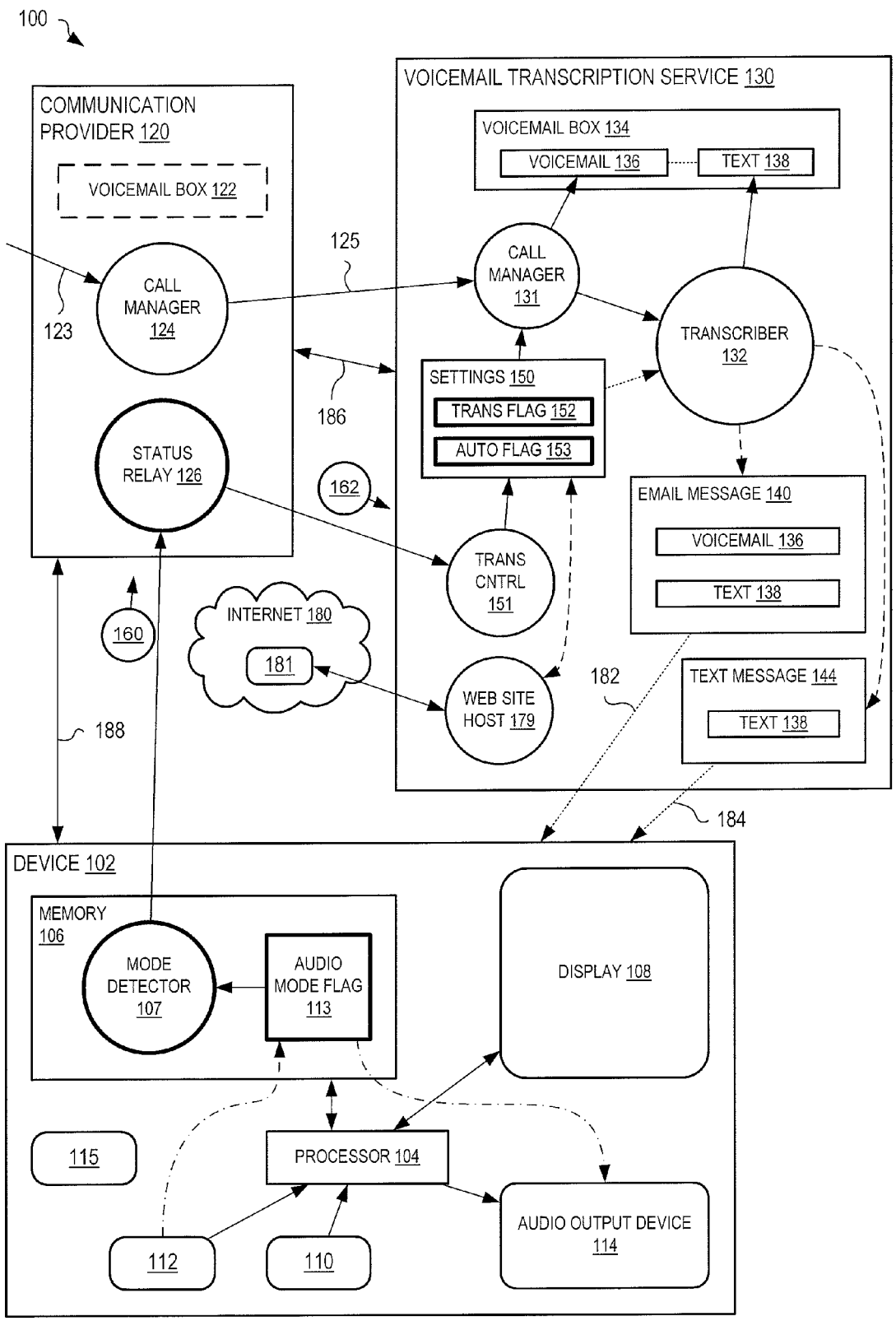
FIG. 1 shows one exemplary system embodiment for controlling a voicemail transcription service from a communication device via a communication provider.

FIG. 1 shows one exemplary system 100 for controlling a voicemail transcription service 130 from a communication device 102 via a communication provider 120. Device 102 has a processor 104, a memory 106, a display 108, an audio input device 110, a keypad device 112 and an audio output device 114. Device 102 is, for example, a mobile phone, a PDA, a smart phone, etc. Audio input device 110 is, for example, a microphone. Keypad device 112 is, for example, a plurality of keys for controlling device 102. Audio output device 114 is, for example, a speaker. Device 102 may include other input and output devices to facilitate control and operation of device 102 by a user. For example, display 108 may include input functionality in the form of a touch sensitive screen. Communication provider 120 provides communication services to device 102 and may represent a cellular telephone network provider that connects wirelessly to device 102. Communication provider 120 may also represent a landline based communication provider that provides a wired connection to device 102; that is, communication between device 102 and communication provider 120 is not necessarily wireless.

Although communication provider 120 may provide voicemail functionality, shown as voicemail box 122, for device 102, voicemail transcription service 130 also provides voicemail services and voicemail box 122 may be unused. A call manager 124 within communication provider 120 operates to forward a call 123, which is unanswered by device 102, to a call manager 131 of voicemail transcription service 130, shown as call 125.

Voicemail transcription service 130 includes a transcriber 132 that transcribes voicemail messages into text. A subscriber of voicemail transcription service 130 may define settings 150 that control options for voicemail transcription service 130, such as options to generate at least one text message 144 containing transcribed text 138 and/or an email message 140 containing a voicemail message 136 and its associated transcribed text 138. Settings 150 may include a transcribe flag 152 that specifies whether voicemail transcription service 130 is to transcribe voicemail messages as received, or not. That is, operation of call manager 131 and transcriber 132 are controlled by settings 150 and in particular transcribe flag 152. Device 102, communication provider 120 and voicemail transcription service 130 are configurable to automatically control transcription of voicemail messages by setting transcribe flag 152 based upon an audio mode of device 102.

In one example of operation, call manager 131 answers call 125 and plays a pre-recorded message that invites the caller to leave a message. Call manager 131 then records the message as voicemail message 136 within a voicemail box 134. Based upon transcribe flag 152, call manager 131 may also send the message audio to transcriber 132 for transcription into text 138. Based upon settings 150, text 138 may be sent to device 102 as one or more text messages 144 and/or email message 140. For example, voicemail transcription service 130 and communication provider 120 communicate via communication link 186 and device 102 and communication provider 120 communication via communication link 188, such that email message 140 and/or text message 144 are delivered to device 102. A subscriber of voicemail transcription service 130 may interact with a web site 181, hosted on Internet 180 by a web site host 179 of voicemail transcription service 130, to change settings 150.

In the example of FIG. 1, device 102 may operate in a normal mode, where an incoming call and/or message causes device 102 to output an audible notification of the incoming call and/or message; or it may operate in silent mode, whereby no audio notification is generated. For example, where the user of device 102 does not want to be disturbed, he may set device 102 into silent mode. An audio mode flag 113 indicates the audio mode of device 102 as either sound on or sound off. Audio mode flag 113, and hence the audio mode of device 102, may be selected using keypad device 112. For example, upon entering a meeting, the user of device 102 may operate keypad device 112 to select sound-off mode. In other embodiments, device 102 includes other mechanisms for controlling the audio mode, such as display 108, where display 108 is input capable, and/or other sensors 115 that detect a physical status of device 102, such as holstering or entering a quiet zone (i.e., an area where cell phone use is restricted). In one example of operation, keypad device 112 includes one or more keys that, when pressed by the user of device 102, toggle the audio mode of device 102 and set the audio mode flag 113 accordingly.

Memory 106 is also shown with a mode detector 107 that operates to detect and/or respond to any change in the audio mode of device 102 based upon audio mode flag 113. In one embodiment, mode detector 107 is a software function within an operating system and/or application of device 102. In another embodiment, mode detector 107 is part of an operating system of device 102 and is automatically invoked upon change of audio mode flag 113. Mode detector 107 is shown within memory 106 for purposes of illustration, but may reside elsewhere within device 102 without departing from the scope hereof.

Upon detection of a change in audio mode flag 113, mode detector 107 sends a status message 160 that indicates the new audio status of device 102 to communication provider 120. Communication provider 120 includes a status relay function 126 that receives status message 160 from device 102 and sends a control message 162 to a transcribe controller 151 within voicemail transcription service 130. In one embodiment, control message 162 is substantially the same as status message 160, each identifying device 102 and its audio mode.

Upon receipt of control message 162, transcribe controller 151 sets transcribe flag 152 according to the indicated audio mode of device 102. In particular, if the audio mode of device 102 transitions to sound-off, transcribe flag 152 is set to true, thereby allowing transcriber 132 to transcribe voicemail messages (e.g., voicemail message 136) into text (e.g., text 138). If the audio mode of device 102 transitions to sound-on, transcribe flag 152 is set to false, thereby stopping transcriber 132 from transcribing voicemail messages into text. Thus, in the example and based upon transcribe flag 152, call manager 131 sends or does not send audio of call 125 to transcriber 132. Call manager 131 may still record call 125 as voicemail message 136, irrespective of the state of transcribe flag 152. Thus, by setting the audio output status of device 102, the user of device 102 may also control transcription of voicemail messages into text.

In one embodiment, settings 150 also include an auto control flag 153 that disables automatic control of transcriber 132 by control message 162, thereby disabling automatic control of voicemail transcription through setting of the audio mode of device 102. That is, automatic transcription control may itself be selected, or not, by the user of device 102 through auto control flag 153 of settings 150.

Email message 140 and text message 144 are delivered to device 102 (as indicated by arrows 182 and 184, respectively) via conventional means known in the art (not shown for clarity of illustration). In one example, voicemail transcription service 130 uses an email service provider to send email message 140 to an email address associated with device 102. Email message 140, when sent to the associated email address, is delivered to device 102 from the email service provider, via communication provider 120. In another example, voicemail transcription service 130 sends text message 144 to communication provider 120 for delivery to device 102.

Figure 2:
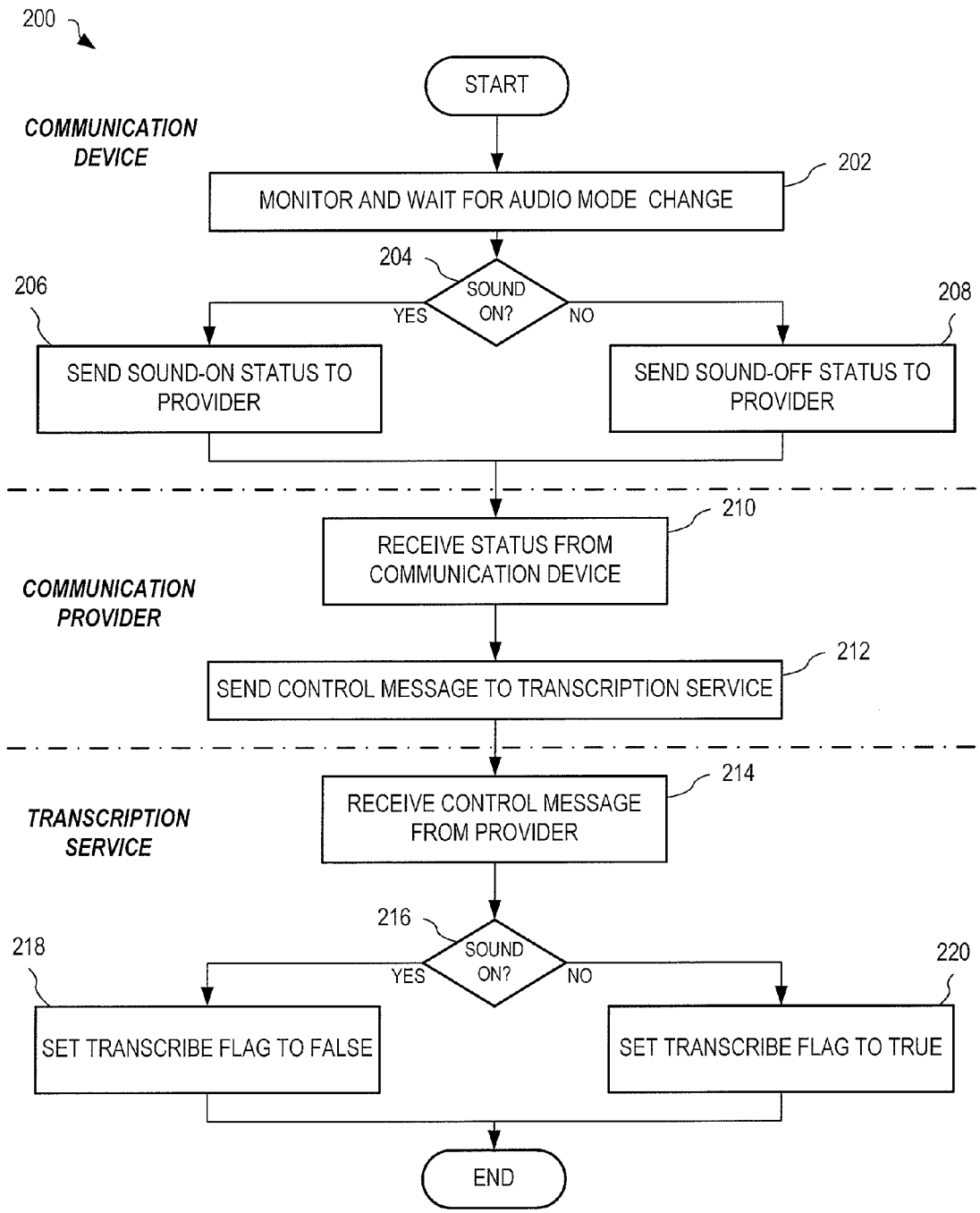
FIG. 2 is a flowchart illustrating one exemplary method embodiment for controlling voicemail transcription service from a communication device via a communication provider.

FIG. 2 is a flowchart illustrating one exemplary method 200 for automatically controlling voicemail transcription from a communication device. Steps 202-208 of method 200 may be located within the communication device (e.g., device 102, FIG. 1). Steps 210 and 212 may be located within a communication provider (e.g., communication provider 120). Steps 214-220 may be located within a voicemail transcription service (e.g., voicemail transcription service 130).

In step 202, method 200 monitors and waits for an audio mode change within the communication device. In one example of step 202, mode detector 107 within device 102 monitors and waits for a change in audio mode flag 113. Step 204 is a decision. If, in step 204, method 200 determines that the audio mode has changed to sound-on, method 200 continues with step 206; otherwise method 200 continues with step 208. In one example of step 204, mode detector 107 evaluates audio mode flag 113 to determine if the audio mode of device 102 is set to sound-on or to sound-off. In step 206, method 200 sends a sound-on status message to the communication provider. In one example of step 206, mode detector 107 sends status message 160, indicating sound-on mode has been set for device 102, to communication provider 120. Method 200 continues with step 210. In step 208, method 200 sends a sound-off status message to the communication provider. In one example of step 208, mode detector 107 sends status message 160, indicating sound-off mode has been set for device 102, to communication provider 120.

In step 210, method 200 receives the status sent in either step 206 or step 208. In one example of step 210, status relay 126 within communication provider 120 receives status message 160 from device 102. In step 212, method 200 sends a control message to the voicemail transcription service. In one example of step 212, status relay 126 sends control message 162, based upon status message 160, to transcription controller 151 within voicemail transcription service 130.

In step 214, method 200 receives the control message sent by the communication provider in step 212. In one example of step 214, transcription controller 151 receives control message 162 from status relay 126 of communication provider 120. Step 216 is a decision. If, in step 216, method 200 determines that the control message specified that the audio mode of the communication device has transitioned to sound-on, method 200 continues with step 218; otherwise method 200 continues with step 220. In one example of step 216, transcription controller 151 evaluates control message 162 to determine if the audio mode of device 102 has transitioned to sound-on or sound-off. In step 218, method 200 sets the transcribe flag associated with the communication device to false to indicate that transcription is not to be performed. Method 200 then terminates. In one example of step 218, transcription controller 151 sets transcription flag 152 to false. In step 220, method 200 sets the transcribe flag associated with the communication device to true to indicate that transcription is to be performed. Method 200 then terminates. In one example of step 220, transcription controller 151 sets transcription flag 152 to true.

Method 200 repeats to control voicemail transcription based upon the audio mode of the communication device. When the audio mode is set to sound-off, transcription of voicemail messages occurs; and when the audio mode is set of sound-on, transcription of voicemail messages is disabled.

Figure 3:
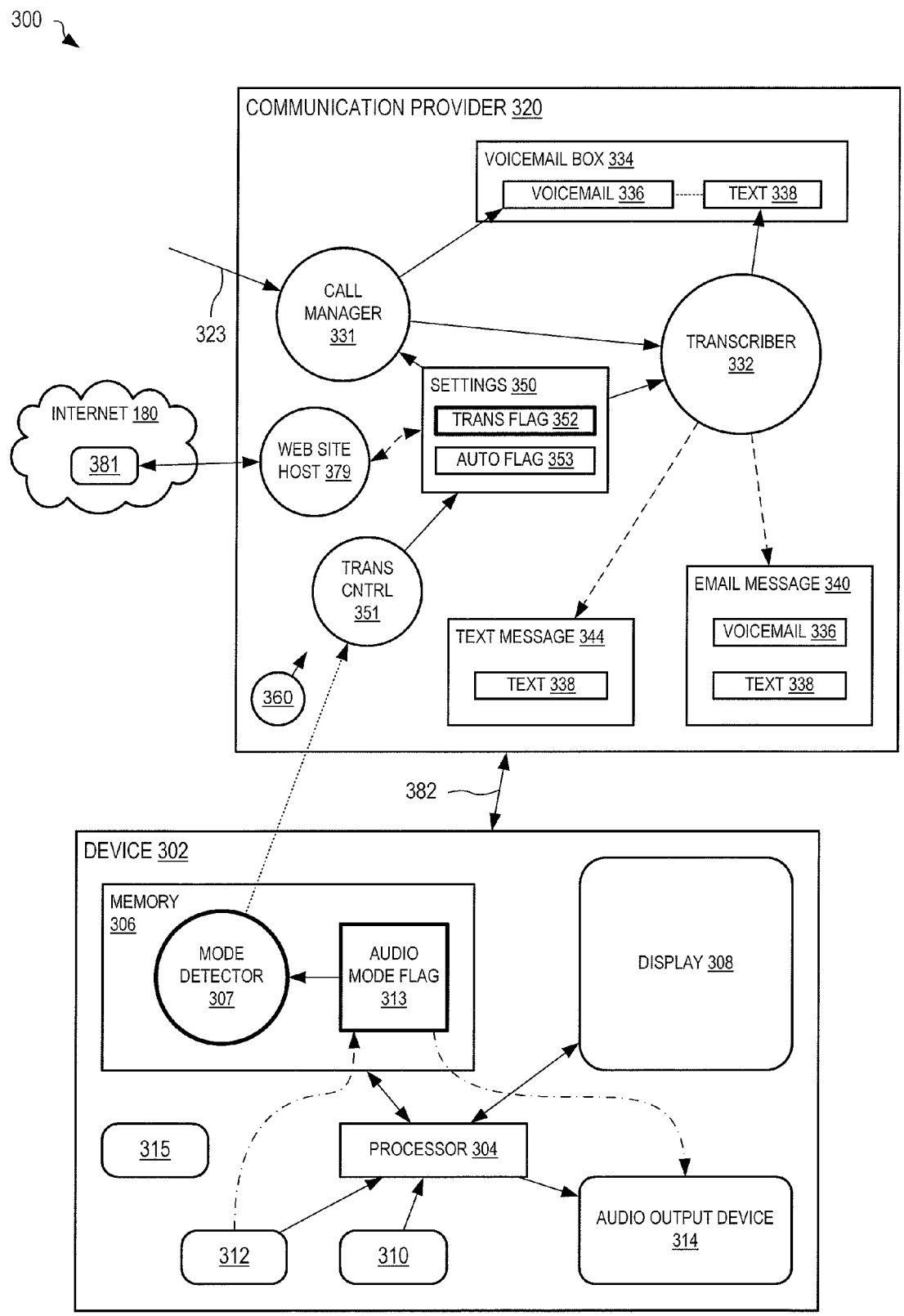
FIG. 3 shows one exemplary system embodiment for controlling a voicemail transcription service from a communication device.

FIG. 3 shows one exemplary system 300 for controlling a voicemail transcription service from a communication device 302. Device 302 has a processor 304, a memory 306, a display 308, an audio input device 310, a keypad device 312 and an audio output device 314. Device 302 is, for example, a mobile phone, a PDA, a smart phone, etc. Audio input device 310 is, for example, a microphone. Keypad device 312 is, for example, a plurality of keys for controlling device 302. Audio output device 314 is, for example, a speaker. Device 302 may include other input and output devices to facilitate control and operation of device 302 by a user. For example, display 308 may include input functionality in the form of a touch sensitive screen. Communication provider 320 provides communication services to device 302 and may represent a cellular telephone network provider that connects wirelessly to device 302. Communication provider 320 may also represent a landline based communication provider that provides a wired connection to device 302; that is, communication between device 302 and communication provider 320 is not necessarily wireless.

Communication provider 320 may provide voicemail functionality, shown as voicemail box 334, for device 302 and may also provide voicemail transcription. A call manager 331 within communication provider 320 operates to receive incoming calls for device 302 and to answer calls unanswered by device 302.

Communication provider 320 includes a transcriber 332 that transcribes voicemail messages into text. Voicemail transcription may be an optional service provided by communication provider 320. A subscriber of communication provider 320 may define settings 350 that control options for voicemail transcription, such as options to generate at least one text message 344 containing transcribed text 338 and/or an email message 340 containing a voicemail message 336 and its associated transcribed text 338. Settings 350 may include a transcribe flag 352 that specifies whether voicemail transcription is operational or not. That is, operation of call manager 331 and transcriber 332 are controlled by settings 350 and in particular by transcribe flag 352. Device 302 and communication provider 320 are configurable to automatically control transcription of voicemail messages by setting transcribe flag 352 based upon an audio mode of device 302.

In one example of operation, call manager 331 answers a call 323 and plays a pre-recorded message that invites the caller to leave a message. Call manager 331 then records the message as voicemail message 336 within voicemail box 334. Based upon transcribe flag 352, call manager 331 may also send the message audio to transcriber 332 for transcription into text 338. Based upon settings 350, text 338 may be sent to device 302 as one or more text messages 344 and/or email messages 340. A subscriber of communication provider 320 may interact with a web site 381, hosted on Internet 180 by a web site host 379 of communication provider 320, to change settings 350.

In the example of FIG. 3, device 302 may operate in a normal mode, where an incoming call and/or message causes device 302 to output an audible notification of the incoming call and/or message; or it may operate in silent mode, whereby no audio notification is generated. For example, where the user of device 302 does not want to be disturbed, he may set device 302 into a quiet mode. Device 302 is thus shown with an audio mode flag 313 that indicates the audio mode of device 302 as either sound on or sound off. Audio mode flag 313, and hence the audio mode of device 302, may be selected using keypad device 312. For example, upon entering a meeting, the user of device 302 may operate keypad device 312 to select sound-off mode (i.e., quiet mode). In other embodiments, device 302 includes other mechanisms for controlling the audio mode, such as via display 308 (e.g., where display 308 is input capable) and/or via other sensors 315 that detect a physical status of device 302 (e.g., holstering, or entry to a quiet zone (i.e., an area where use of cell phones is restricted)). In one example of operation, keypad device 312 includes one or more keys that, when pressed by the user of device 302, toggle the audio mode of device 302 and set the audio mode flag 313 accordingly.

Memory 306 is also shown with a mode detector 307 that operates to detect and/or respond to any change in the audio mode of device 302 based upon audio mode flag 313. In one embodiment, mode detector 307 is a software function within an operating system and/or application of device 302. In another embodiment, mode detector 307 is part of an operating system of device 302 and is automatically invoked upon change of audio mode flag 313. Mode detector 307 is shown within memory 306 for purposes of illustration, but may reside elsewhere within device 302 without departing from the scope hereof.

Upon detection of a change in audio mode flag 313, mode detector 307 sends a status message 360 that indicates the new audio status of device 302 to communication provider 320. Communication provider 320 includes a transcribe controller 351 for receiving status message 360.

Upon receipt of status message 360, transcribe controller 351 sets transcribe flag 352 according to the indicated audio mode of device 302. In particular, if the audio mode of device 302 transitions to sound-off, transcribe flag 352 is set to true, thereby allowing transcriber 332 to transcribe voicemail messages (e.g., voicemail message 336) into text (e.g., text 338); if the audio mode of device 302 transitions to sound-on, transcribe flag 352 is set to false, thereby stopping transcriber 332 from transcribing voicemail messages into text. Thus, in the example and based upon transcribe flag 352, call manager 331 sends or does not send audio of call 323 to transcriber 332. Call manager 331 may still record call 323 as voicemail message 336, irrespective of the state of transcribe flag 352. Thus, by setting the audio output status of device 302, the user of device 302 may also control transcription of voicemail messages into text.

In one embodiment, settings 350 also include an auto control flag 353 that disables automatic control of transcriber 332 by status message 360, thereby disabling automatic control of voicemail transcription through setting of the audio mode of device 302. That is, automatic transcription control may itself be selected, or not, by the user of device 302 through auto control flag 353 of settings 350. In another embodiment, operation of mode detector 307 is selectable by the user of device 302, thereby enabling or disabling automatic control of voicemail transcription.

Email message 340 and text message 344 may be delivered to device 302 using a communication link 382, or other means known in the art. In one example, email message 340 is sent (via an email service provider, not shown) to an email address associated with device 302 and is delivered to device 302 via communication provider 320 using communication link 382. In another example, text message 344 is delivered to device 302 directly from communication provider 320 via communication link 382 using known text message delivery means.

Figure 4:
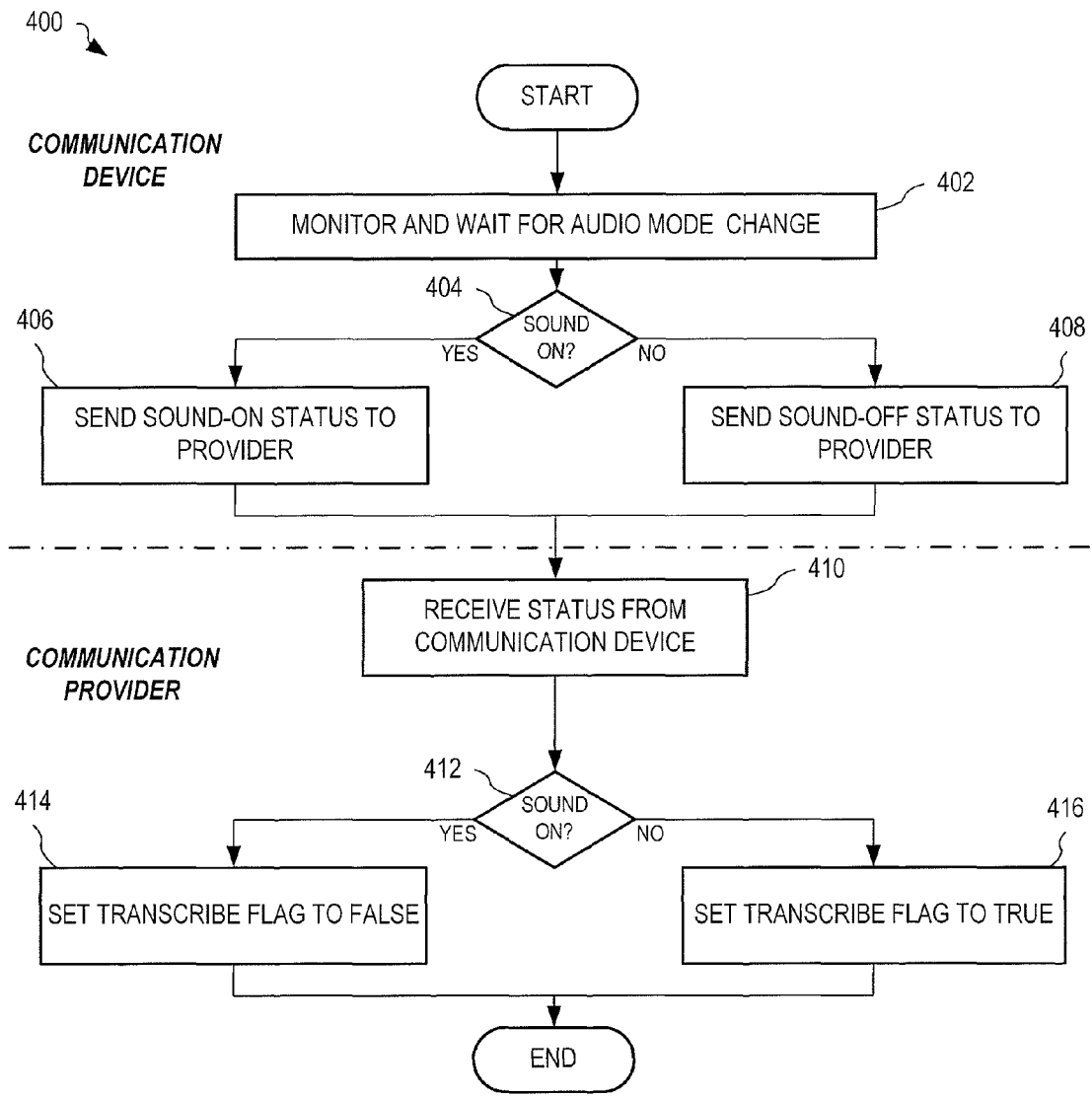
FIG. 4 is a flowchart illustrating one exemplary method embodiment for controlling voicemail transcription service from a communication device.

FIG. 4 is a flowchart illustrating one exemplary method 400 for controlling voicemail transcription service from a communication device. Steps 402-408 of method 400 may be located within the communication device (e.g., device 302, FIG. 3). Steps 410-416 may be located within a communication provider (e.g., communication provider 320).

In step 402, method 400 monitors and waits for an audio mode change within the communication device. In one example of step 402, mode detector 307 within device 302 monitors and waits for a change in audio mode flag 313. Step 404 is a decision. If, in step 404, method 400 determines that the audio mode has changed to sound-on, method 400 continues with step 406; otherwise method 400 continues with step 408. In one example of step 404, mode detector 307 evaluates audio mode flag 313 to determine if the audio mode of device 302 is set to sound-on or to sound-off. In step 406, method 400 sends a sound-on status message to the communication provider. In one example of step 406, mode detector 307 sends status message 360, indicating sound-on mode has been set for device 302, to communication provider 320. Method 400 continues with step 410. In step 408, method 400 sends a sound-off status message to the communication provider. In one example of step 408, mode detector 307 sends status message 360, indicating sound-off mode has been set for device 302, to communication provider 320.

In step 410, method 400 receives the status sent in either step 406 or step 408. In one example of step 410, transcribe controller 351 within communication provider 320 receives status message 360 from device 302.

Step 412 is a decision. If, in step 412, method 400 determines that the status message specifies that the audio mode of the communication device has transitioned to sound-on, method 400 continues with step 414; otherwise method 400 continues with step 416. In one example of step 412, transcribe controller 351 evaluates status message 360 to determine if the audio mode of device 302 has transitioned to sound-on or sound-off. In step 414, method 400 sets the transcribe flag associated with the communication device to false to indicate that transcription is not to be performed. Method 400 then terminates. In one example of step 414, transcribe controller 351 sets transcribe flag 352 to false. In step 416, method 400 sets the transcribe flag associated with the communication device to true to indicate that transcription is to be performed. Method 400 then terminates. In one example of step 416, transcribe controller 351 sets transcribe flag 352 to true.

Method 400 repeats to control voicemail transcription based upon the audio mode of the communication device. When the audio mode is set to sound-off, transcription of voicemail messages occurs; and when the audio mode is set to sound-on, transcription of voicemail messages is disabled.

Figure 5:
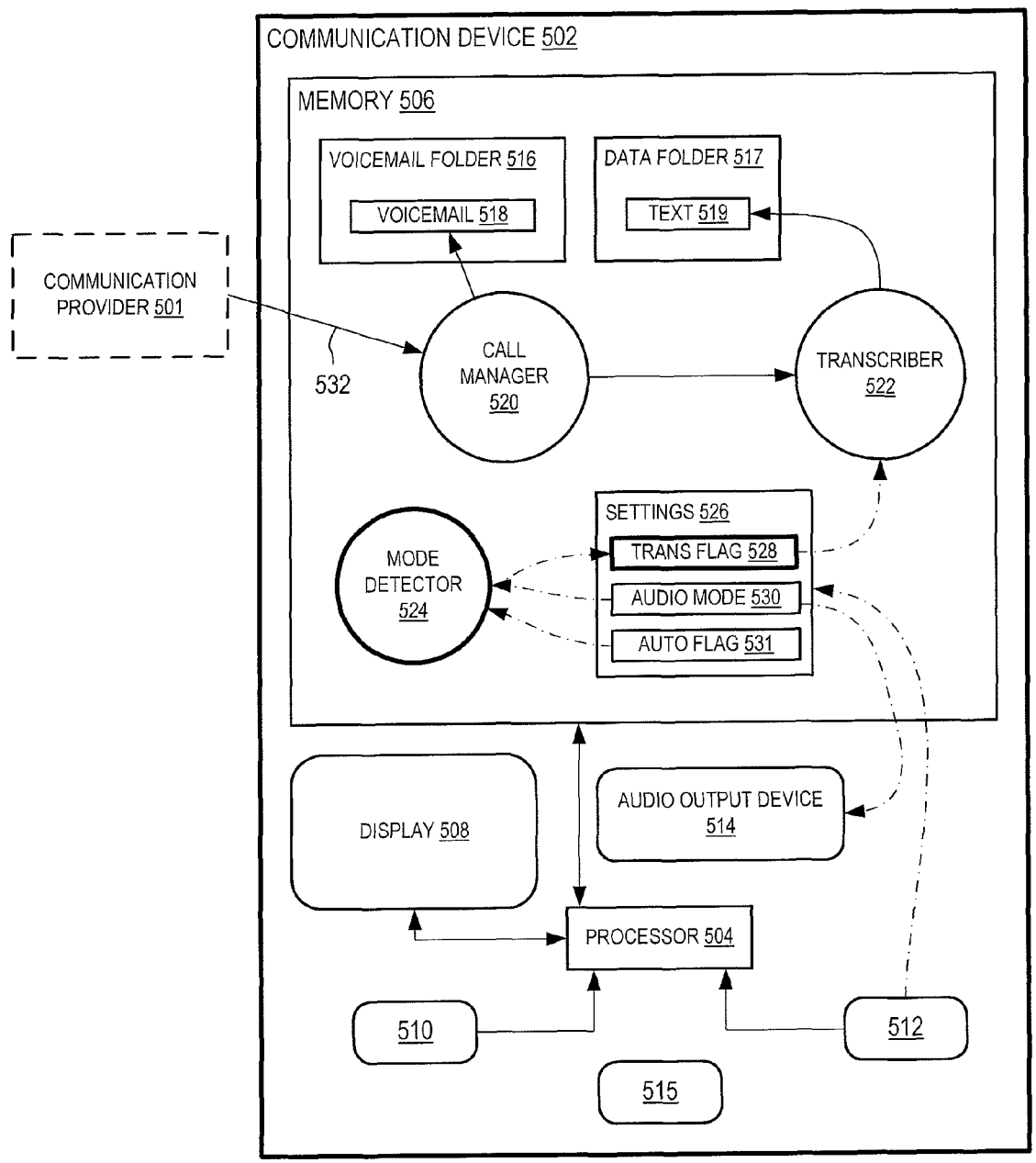
FIG. 5 shows one exemplary system embodiment for controlling a voicemail transcription within a communication device.

FIG. 5 shows one exemplary system 500 for controlling voicemail transcription within a communication device 502. Device 502 has a processor 504, a memory 506, a display 508, an audio input device 510, a keypad device 512 and an audio output device 514. Device 502 is, for example, a mobile phone, a PDA, a smart phone, etc. Audio input device 510 is, for example, a microphone. Keypad device 512 is, for example, a plurality of keys for controlling device 502. Audio output device 514 is, for example, a speaker. Device 502 may include other input and output devices to facilitate control and operation of device 502 by a user. For example, display 508 may include input functionality in the form of a touch sensitive screen. Communication device 502 may communicate with a communication provider 501 that provides communication services to device 502 and may represent a cellular telephone network provider that connects wirelessly to device 502. Communication device 502 may also connect to a communication provider by a wired connection; that is, communication between device 502 and the communication provider is not necessarily wireless.

Communication device 502 has a call manager 520 that provides voicemail functionality and is shown with a voicemail folder 516 for storing voicemail messages. Device 502 also includes a transcriber 522 for transcribing voicemail messages into text. Call manager 520 operates to receive incoming calls to device 502 and to answer calls that are unanswered by the user of device 502, recording the audio of the call as voicemail message 518 within voicemail folder 516.

Settings 526 may include a transcribe flag 528 that specifies whether voicemail transcription is operational or not. That is, operation of call manager 520 and transcriber 522 may be controlled by settings 526 and in particular transcribe flag 528. Device 502 is configurable to automatically control transcription of voicemail messages by setting transcribe flag 528 based upon an audio mode of device 502.

In one example of operation, call manager 520 answers a call 532 and plays a pre-recorded message that invites the caller to leave a message. Call manager 520 then records the message as voicemail message 518 within voicemail folder 516. Based upon transcribe flag 528, call manager 520 may also send the message audio to transcriber 522 for transcription into text 519 that is stored within a data folder 517 of memory 506. Settings 526 may be interactively changed by the user of device 502 through use of display 508 and keypad device 512.

In the example of FIG. 5, device 502 may operate in a normal mode, where an incoming call and/or message causes device 502 to output an audible notification of the incoming call and/or message; or it may operate in silent mode, whereby no audio notification is generated. For example, where the user of device 502 does not want to be disturbed, he may set device 502 into a quite mode. Device 502 is shown with an audio mode flag 530, within settings 526, that indicates the audio mode of device 502 as either sound on or sound off. Audio mode flag 530, and hence the audio mode of device 502, may be selected using keypad device 512. For example, upon entering a meeting, the user of device 502 may operate keypad device 512 to select sound-off mode (i.e., quiet mode). In other embodiments, device 502 includes other mechanisms for controlling the audio mode, such as via display 508 (e.g., where display 508 is input capable) and/or via other sensors 515 that detect a physical status of device 502 (e.g., holstering, or entry to a quiet zone (i.e., an area where use of cell phones is restricted)). In one example of operation, keypad device 512 includes one or more keys that, when pressed by the user of device 502, toggle the audio mode of device 502 and set the audio mode flag 530 accordingly.

Memory 506 is also shown with a mode detector 524 that operates to detect and/or respond to any change in the audio mode of device 502 based upon audio mode flag 530. In one embodiment, mode detector 524 is a software function within an operating system and/or application of device 502. In another embodiment, mode detector 524 is part of an operating system of device 502 and is automatically invoked upon change of audio mode flag 530. Mode detector 524 is shown within memory 506 for purposes of illustration, but may reside elsewhere within device 502 without departing from the scope hereof.

Upon detection of a change in audio mode flag 530, mode detector 524 sets transcribe flag 528 according to the audio mode of device 502. In particular, if the audio mode of device 502 transitions to sound-off, transcribe flag 528 is set to true, thereby allowing transcriber 522 to transcribe voicemail messages (e.g., voicemail message 518) into text (e.g., text 519); if the audio mode of device 502 transitions to sound-on, transcribe flag 528 is set to false, thereby stopping transcriber 522 from transcribing voicemail messages into text. Thus, in the example and based upon transcribe flag 528, call manager 520 sends or does not send audio of call 532 to transcriber 522. Call manager 520 may still record call 532 as voicemail message 518, irrespective of the state of transcribe flag 528. Thus, by setting the audio output status of device 502, the user of device 502 may also control transcription of voicemail messages into text.

In one embodiment, settings 526 also include an auto control flag 531 that disables automatic control of mode detector 524 by audio mode flag 530, thereby disabling automatic control of voicemail transcription through setting of the audio mode of device 502. That is, automatic transcription control may itself be selected, or not, by the user of device 502 through auto control flag 531 of settings 526.

A user may interact with communication device 502 to view text 519 on display 508 and/or play voicemail 518 using audio output device 514.

Figure 6:
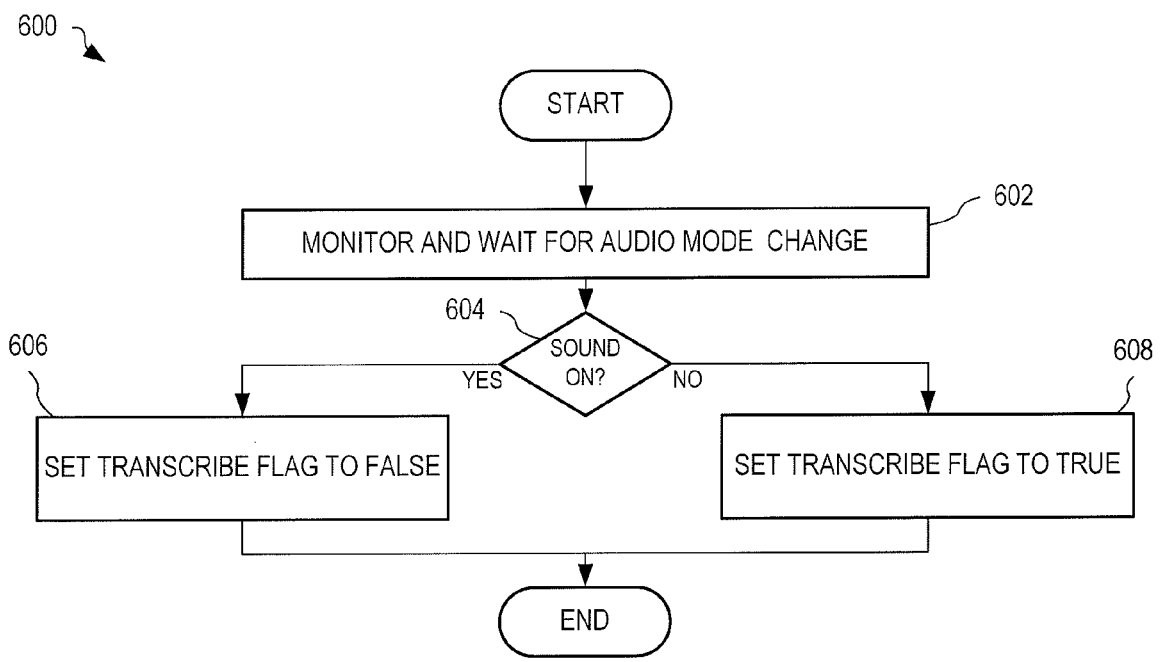
FIG. 6 is a flowchart illustrating one exemplary method embodiment for controlling voicemail transcription within a communication device.

FIG. 6 is a flowchart illustrating one exemplary method 600 for controlling voicemail transcription within a communication device. Method 600 may be implemented, for example, by mode detector 524 of communication device 502, FIG. 5.

In step 602, method 600 monitors and waits for an audio mode change within the communication device. In one example of step 602, mode detector 524 within device 502 monitors and waits for a change in audio mode flag 530. Step 604 is a decision. If, in step 604, method 600 determines that the audio mode has changed to sound-on, method 600 continues with step 606; otherwise method 600 continues with step 608. In one example of step 604, mode detector 524 evaluates audio mode flag 530 to determine if the audio mode of device 502 is set to sound-on or to sound-off. In step 606, method 600 sets the transcribe flag associated with the communication device to false to indicate that transcription is not to be performed. Method 600 then terminates. In one example of step 606, mode detector 524 sets transcribe flag 528 to false. In step 608, method 600 sets the transcribe flag associated with the communication device to true to indicate that transcription is to be performed. Method 600 then terminates. In one example of step 608, mode detector 524 sets transcribe flag 528 to true.

Method 600 repeats to control voicemail transcription based upon the audio mode of the communication device. When the audio mode is set to sound-off, transcription of voicemail messages occurs; and when the audio mode is set of sound-on, transcription of voicemail messages is disabled.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A method for controlling voicemail transcription service remote from a user communication device, comprising:
   monitoring, within the communication device, an audio mode to determine a change in status between a sound-on mode and a sound-off mode;
   enabling automatic transcription of voicemail messages in response to receiving the status of the audio mode transitioning from sound-on to sound-off; and
   disabling automatic transcription of voicemail messages in response to
      receiving the status of the audio mode
      transitioning from sound-off to sound-on.

2. The method of claim 1, further comprising transcribing the voicemail through a voicemail transcription service.

3. The method of claim 2, the step of enabling comprising sending a transcribe-on command to the voicemail transcription service.

4. The method of claim 3, further comprising relaying, from a communication provider associated with the communication device, the transcribe-on command to the voicemail transcription service.

5. The method of claim 2, the step of disabling comprising sending a transcribe-off command to the voicemail transcription service.

6. The method of claim 5, further comprising relaying, from the communication provider, the transcribe-off command to the voicemail transcription service.

7. The method of claim 1, further comprising transcribing the voicemail within a communication provider associated with the communication device.

8. The method of claim 7, the step of enabling comprising sending a transcribe-on command to the communication provider.

9. The method of claim 7, the step of disabling comprising sending a transcribe-off command to the communication provider.

10. The method of claim 1, the step of enabling comprising enabling automatic transcription of voicemail messages if the audio mode status transitions from sound-on to sound-off and an auto control flag indicates that automatic control of transcription is enabled.

11. The method of claim 1, the step of disabling comprising disabling automatic transcription of voicemail messages if the audio mode status transitions from sound-off to sound-on and an auto control flag indicates that automatic control of transcription is disabled.

12. A method for controlling a voicemail transcription service remote from a user communication device, comprising:
   monitoring, within the communication device, an audio mode to determine a change in status between a sound-on mode and a sound-off mode;
   sending a transcribe-on command to the voicemail transcription service if the audio mode status transitions from sound-on to sound-off;
   sending a transcribe-off command to the voicemail transcription service if the audio mode status transitions from sound-off to sound-on;
   enabling automatic transcription of voicemail messages received by the voicemail transcription service upon receiving the transcribe-on command; and
   disabling automatic transcription of voicemail messages received by the voicemail transcription service upon receiving the transcribe-off command.

13. A system for controlling voicemail transcription service remote from a user communication device, comprising:
   the communication device having an audio mode selectable between sound-on and sound-off; and
   a mode detector, within the communication device, for detecting a transition in the audio mode between sound-on and sound-off, the mode detector remotely activating and deactivating automatic transcription of voicemail messages into text based on the detected transition.

14. The system of claim 13, the mode detector activating the automatic transcription when the audio mode transitions to sound-off.

15. The system of claim 13, the mode detector deactivating the automatic transcription when the audio mode transitions to sound-on.

16. The system of claim 13, further comprising an auto control flag for indicating whether control of automatic transcription of voicemail messages into text is enabled or not, the mode detector not detecting, activating and deactivating automatic transcription if the auto control flag indicates control of automatic transcription is not enabled.

17. The system of claim 13, further comprising a transcriber for translating voicemail messages into text.

18. The system of claim 13, further comprising one or more sensors for determining the audio mode of the device based upon a physical status of the device.

19. A system for controlling a voicemail transcription service remote from a user communication device, comprising:
   the communication device having an audio mode variable between a sound-on status and a sound-off status;
   a communication provider in communication with the communication device and the voicemail transcription service;
   a mode detector, within the communication device, for detecting a transition in the audio mode between sound-on status and sound-off status, the mode detector sending a status message indicating the audio mode status to the communication provider;
   a status relay within the communication provider for sending the status message to the voicemail transcription service; and
   a voicemail transcription controller, within the voicemail transcription service, for activating and deactivating automatic transcription of voicemail messages into text, based on the audio mode status based on the audio mode status.

20. A software product comprising instructions, stored on non-transitory computer-readable media, wherein the instructions, when executed by a computer, perform steps for controlling a voicemail transcription service remote from a user communication device, comprising:
   instructions for monitoring, within the communication device, an audio mode to determine a change in status between a sound-on mode and a sound-off mode;
   instructions for enabling automatic transcription of voicemail messages in response to receiving the status of the audio mode transitioning from sound-on to sound-off; and
   instructions for disabling automatic transcription of voicemail messages in response to receiving the status of the audio mode transitioning from sound-off to sound-on.

21. The software product of claim 20, further comprising instructions for transcribing the voicemail through a voicemail transcription service.

22. The software product of claim 21, the instructions for enabling comprising instructions for sending a transcribe-on command to the voicemail transcription service.

23. The software product of claim 22, further comprising instructions for relaying, from a communication provider associated with the communication device, the transcribe-on command to the voicemail transcription service.

24. The software product of claim 21, the instructions for disabling comprising instructions for sending a transcribe-off command to the voicemail transcription service.

25. The software product of claim 24, further comprising instructions for relaying, from the communication provider, the transcribe-off command to the voicemail transcription service.

26. The software product of claim 20, further comprising instructions for transcribing the voicemail within the communication device.

27. The software product of claim 20, further comprising instructions for transcribing the voicemail within a communication provider associated with the communication device.

28. The software product of claim 27, the instructions for enabling comprising sending a transcribe-on command to the communication provider.

29. The software product of claim 27, the instructions for disabling comprising instructions for sending a transcribe-off command to the communication provider.

30. The software product of claim 20, the instructions for enabling comprising instructions for enabling automatic transcription of voicemail messages if the audio mode status transitions from sound-on to sound-off and an auto control flag indicates that automatic control of transcription is enabled.

31. The software product of claim 20, the instructions for disabling comprising instructions for disabling automatic transcription of voicemail messages if the audio mode status transitions from sound-off to sound-on and an auto control flag indicates that automatic control of transcription is disabled.

* * * * *

UNITED STATES PATENT AND TRADEMARK OFFICE
CERTIFICATE OF CORRECTION

PATENT NO. : 8,184,780 B2  
APPLICATION NO. : 12/055898  
DATED : May 22, 2012  
INVENTOR(S) : James Siminoff Page 1 of 1

It is certified that error appears in the above-identified patent and that said Letters Patent is hereby corrected as shown below:

Column 12, lines 43-44, delete the second instance of "based on the audio mode status"

Signed and Sealed this
Twenty-eighth Day of August, 2012

David J. Kappos
*Director of the United States Patent and Trademark Office*